(12) United States Patent
Leimann et al.

(10) Patent No.: US 8,794,094 B2
(45) Date of Patent: Aug. 5, 2014

(54) PARALLEL GEAR UNIT FOR A GEARBOX FOR A WIND TURBINE

(75) Inventors: Dirk-Olaf Leimann, Edegem (BE); Erwin Van Eyndhoven, Aartselaar (BE)

(73) Assignee: Hansen Transmissions International N.V., Kontich (BE)

( * ) Notice: Subject to any disclaimer, the term of this patent is extended or adjusted under 35 U.S.C. 154(b) by 1022 days.

(21) Appl. No.: 12/849,084

(22) Filed: Aug. 3, 2010

(65) Prior Publication Data

US 2011/0030491 A1   Feb. 10, 2011

(30) Foreign Application Priority Data

Aug. 10, 2009   (EP) .................................. 09447041

(51) Int. Cl.
| | | |
|---|---|---|
| *F16D 9/06* | (2006.01) | |
| *F16H 55/08* | (2006.01) | |
| *F16H 57/02* | (2012.01) | |
| *F16H 1/06* | (2006.01) | |
| *F16H 1/20* | (2006.01) | |
| *F03D 11/02* | (2006.01) | |

(52) U.S. Cl.
CPC ......... *F03D 11/02* (2013.01); *F05B 2260/4031* (2013.01); *Y02E 10/722* (2013.01); *F16H 57/02004* (2013.01)
USPC .......................................... 74/413; 74/412 R (58) Field of Classification Search
USPC ............. 74/412 R, 413, 421 R; 384/420, 590
See application file for complete search history.

(56) References Cited

U.S. PATENT DOCUMENTS

| | | | | |
|---|---|---|---|---|
| 1,759,689 | A * | 5/1930 | Day ................................. | 74/410 |
| 2,133,102 | A * | 10/1938 | Kuhns ............................. | 74/413 |
| 2,974,538 | A * | 3/1961 | Jennings ....................... | 74/421 R |
| 4,369,668 | A | 1/1983 | Pollak-Banda et al. | |
| 4,687,411 | A * | 8/1987 | Maeda et al. ............... | 415/122.1 |
| 2007/0099745 | A1 | 5/2007 | Fox | |
| 2011/0150383 | A1* | 6/2011 | Yoshida et al. ............... | 384/590 |

FOREIGN PATENT DOCUMENTS

| | | |
|---|---|---|
| EP | 0 021 223 | 1/1981 |
| EP | 0 157 059 | 10/1985 |
| FR | 2 496 214 | 6/1982 |
| JP | 58-160651 | 9/1983 |
| JP | 2007-100821 | 4/2007 |

OTHER PUBLICATIONS

European Search Report dated Dec. 16, 2009, from corresponding European application.

* cited by examiner

*Primary Examiner* — Justin Krause
(74) *Attorney, Agent, or Firm* — Young & Thompson (57) ABSTRACT

A parallel gear unit (20) for a gearbox (30) for a wind turbine includes at least two parallel shafts (21, 22), at least one of the shafts (21, 22) being supported by roller bearings (24) and each shaft (21, 22) including a gear (23, 25) with helical teeth, the gears (23, 25) of each shaft (21, 22) being adapted for meshing with each other. The parallel gear unit (20) furthermore includes a thrust collar (26) on at least one of the shafts (21, 22). In a parallel gear unit (20) according to preferred embodiments, the bearings (24) supporting the gear do not suffer from high axial forces or at least suffer less from such axial forces than prior art bearings. A gearbox (30) including the parallel gear unit (20) and a wind turbine including such a gearbox (30) are described.

8 Claims, 8 Drawing Sheets

PARALLEL GEAR UNIT FOR A GEARBOX FOR A WIND TURBINE

TECHNICAL FIELD OF THE INVENTION

The present invention relates to a parallel gear unit for a gearbox for a wind turbine. More particularly, the present invention relates to a parallel gear unit for a gearbox for a multi-megawatt wind turbine. The present invention provides a parallel gear unit comprising a thrust collar on at least one of its shafts, a gearbox comprising such parallel gear unit and a multi-megawatt wind turbine comprising a gearbox comprising such parallel gear unit.

BACKGROUND OF THE INVENTION

As wind energy business becomes more and more important, gearbox concepts are thoroughly studied nowadays. Known concepts of gearboxes for wind turbines may comprise at least one planetary gear unit and a parallel gear unit for connecting the planetary gear unit to the generator of the wind turbine.

Figure 1:
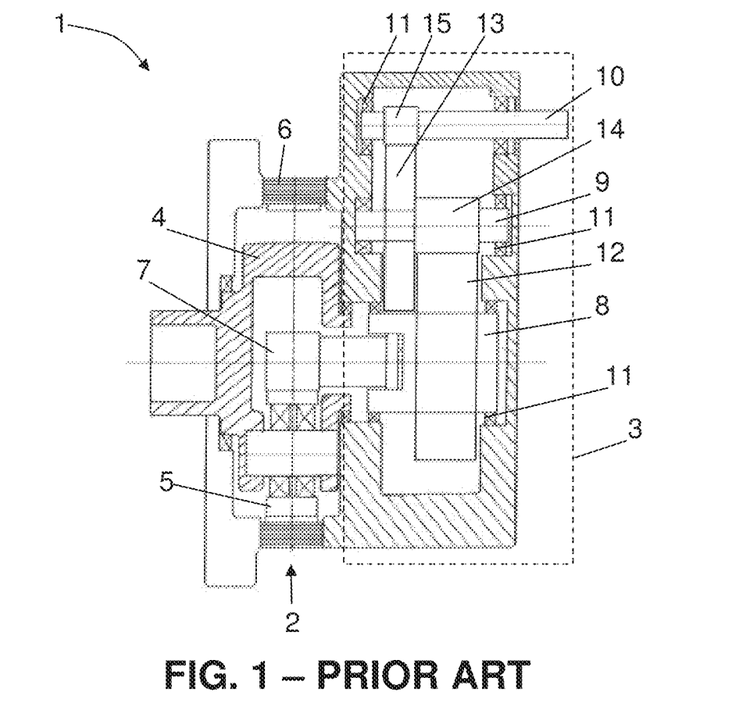
FIG. 1 to FIG. 3 illustrate gearbox concepts according to the prior art.
Figure 2:
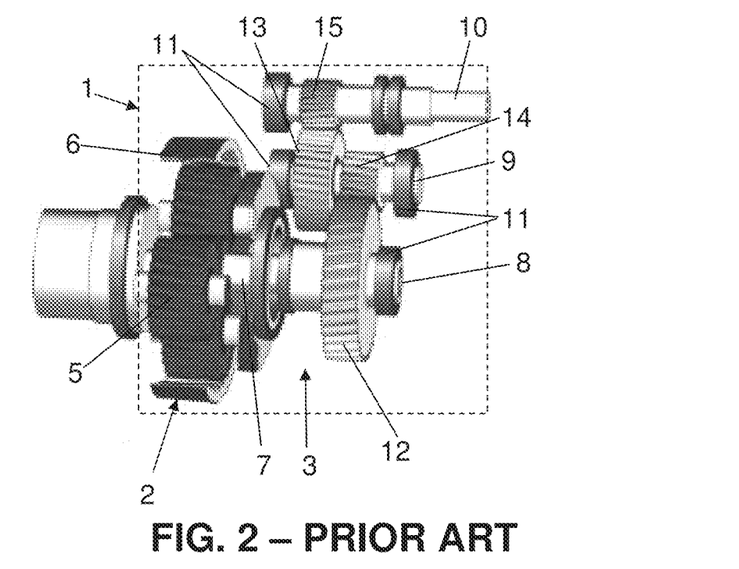

FIG. 1 and FIG. 2 schematically illustrate a type of gearbox 1 for a wind turbine according to the prior art. In this example, the gearbox 1 comprises one planetary gear unit 2 and a two-stage parallel gear unit 3. The planetary gear unit 2 comprises a planet carrier 4 which supports a plurality of planet gears 5. The planetary gear unit 2 furthermore comprises a ring gear 6 and a sun gear 7. In the example given in FIG. 1 and FIG. 2 the two-stage parallel gear unit 3 comprises a low speed shaft 8, an intermediate shaft 9 and a high speed shaft 10, which are all parallel to each other and which are each rotatably supported by bearings 11. The parallel gear unit 3 furthermore comprises two gears 12, 13. One gear 12 is carried on the low speed shaft 8 and the intermediate shaft 9 and the other gear 13 is carried on the intermediate shaft 9 and the high speed shaft 10. The gears 12, 13 respectively mesh with pinion 14 on the intermediate shaft 9 and pinion 15 on the high speed shaft 10.

Figure 3:
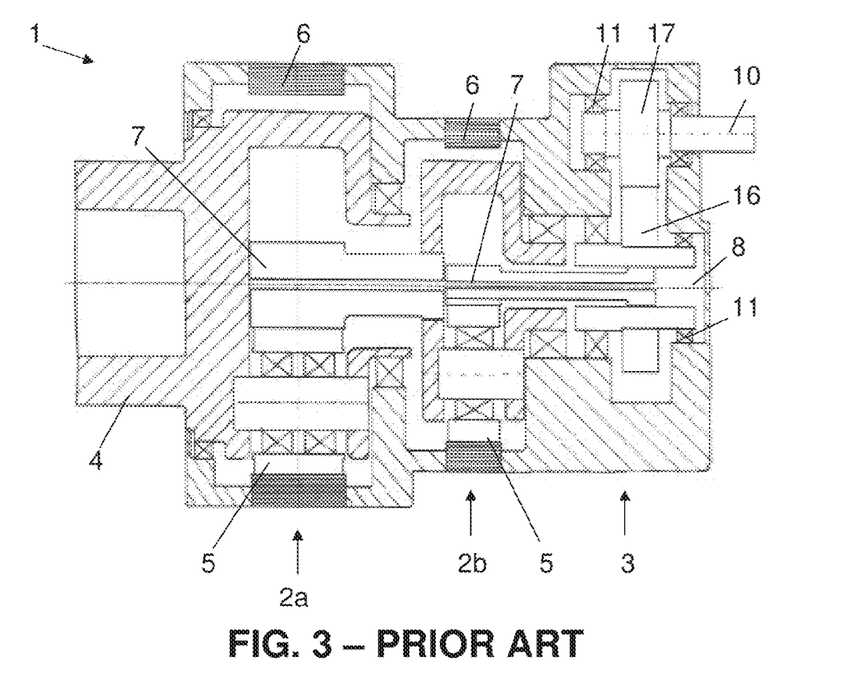

According to other known concepts, gearboxes 1 for wind turbines may comprise two planetary gear units 2 and a one-stage parallel gear unit 3. This is illustrated in FIG. 3. In the example given in FIG. 3, the gearbox 1 comprises a first planetary gear unit 2a, a second planetary gear unit 2b and a one-stage parallel gear unit 3. Each of the planetary gear units 2a, 2b comprises a planet carrier 4 which supports a plurality of planet gears 5, a ring gear 6 and a sun gear 7. The parallel gear unit 3 of the present example differs from the example shown in FIG. 1 and FIG. 2 in that it only comprises a low speed shaft 8 and a high speed shaft 10, but no intermediate shaft 9. The low speed shaft 8 and the high speed shaft 10 are rotatably supported by bearings 11. In this example, the parallel gear unit 3 comprises one gear 16 which is carried on the low speed shaft 8 and the high speed shaft 10 and which meshes with pinion 17 on the high speed shaft 10.

During operation of the wind turbine, loads acting on shafts and planets and forces originating at tooth contracts are created in the gearbox 1. Uptake of such loads and forces is currently done by using rolling bearings. Such bearings are provided at, for example, the high speed shaft of the parallel gear unit 3 of the gearbox 1 and have to take up loads originating from the gearing.

Because noise behaviour is an important parameter in the design of wind turbine gearboxes and especially in multi-megawatt wind turbine gearboxes, gears in the parallel gear unit 3 are normally provided with a helical toothing with a big helix angle. However, because of this big helix angle radial and high axial forces are created which are to be uptaken by the bearings provided on the shafts.

Bearing arrangements of e.g. high speed shafts can be designed as located or a combination of located and non-located bearing arrangements. However, there is at least one bearing that takes axial load or a combination of axial and radial loads.

During operation, wind turbines, and especially multi-megawatt wind turbines, create high dynamic forces to and speed variations in the gearbox 1. Because of that, loads and speeds during operation of the gearbox can differ from the design loads and speeds, i.e. from the predicted loads and speeds during design of the gearbox, and even reverse loads can occur.

However, for multi-megawatt wind turbines, roller bearings 11 which are available on the market may not be able to take up combined loads from axial forces and radial forces any more. Especially the axial forces can be critical on the roller bearings 11. This dynamic behaviour can lead to bearing damages and consequently to bearing failures.

Equivalent dynamic bearing load is determined by:

$$P \approx x \cdot F_r + y \cdot F_a$$

wherein $F_r$ is the actual radial bearing load, $F_a$ the actual axial bearing load, x the radial load factor for the bearing and y the axial load factor for the bearing. The factors x and y depend on the type of bearings used. In case of, for example, a taper roller bearing x may be 0.4 and y may be between 1.3 and 1.6, which illustrates that the contribution of the axial load to the total load is much higher than that of the radial load.

With increase of transmitted power of multi-megawatt wind turbines and the use of gearing with a big helix angle, bearings are required with high capacity in order to be able to take up the actual loads. A disadvantage of this, however, is that with higher bearing capacity the size of the bearings increases and the very important limiting or maximum speed of the bearing decreases.

Lots of wind turbines have generators running with 1500 up to 2000 rpm what is their maximum speed and therefore the nominal speed of the gearbox shaft. While having combined forces out of radial and axial loads, the resulting load can be higher than the radial load. In these cases, no suitable roller bearings can be found to take up the loads under the required speed.

SUMMARY OF THE INVENTION

It is an object of embodiments of the present invention to provide a parallel gear unit for a gearbox in a multi-megawatt wind turbine, a gearbox comprising such parallel gear unit and a multi-megawatt wind turbine comprising a gearbox comprising such parallel gear unit.

The above objective is accomplished by a method and device according to embodiments of the present invention.

Embodiments of the present invention are intended to provide a parallel gear unit for a gearbox for a wind turbine in which the bearings can withstand the axial and radial loads originating from gear toothing and still allows high rotational speed of, for example, between 1500 and 2000 rpm.

The invention is based on the insight that, because of the increasing output power and thus the increasing load that are created inside the gearbox of multi-megawatt wind turbines, finding or developing suitable bearings that fulfill all of the above described requirements for parallel gear units for gearboxes is very difficult or even no longer possible, but that a combination of suitable bearing arrangements and the use of a thrust collar on at least one shaft, for example the high speed shaft, of the parallel gear unit can provide suitable uptake of axial and radial loads originating from gear toothing while still allowing high rotational speeds of, for example, between 1500 and 2000 rpm.

By using suitable bearing arrangements together with a thrust collar according to embodiments of the present invention axial loads are not transferred to the bearings but only the radial loads are. Furthermore, at least the shaft(s) on which the thrust collar is provided, e.g. the high speed shaft, is only loaded with radial forces.

In a first aspect, the present invention provides a parallel gear unit for a gearbox for a multi-megawatt wind turbine. With multi-megawatt wind turbine is meant a wind turbine which is able to generate more than 1 megawatt of electricity. The parallel gear unit comprises at least two parallel shafts, at least one of the shafts being supported by roller bearings and each of the shafts comprising a gear with helical teeth, the gears of each shaft being adapted for meshing with each other. The parallel gear unit furthermore comprises a thrust collar on at least one of the shafts.

According to embodiments of the invention, each of the shafts may be supported by roller bearings.

According to other embodiments of the invention, one of the shafts, preferably the shaft provided with the gear with smallest diameter, may be supported by sliding bearings while the other shaft(s) may be supported by roller bearings. For example, the parallel gear unit may comprise at least a high speed shaft and a low speed shaft and, according to embodiments of the invention, the high speed shaft of the parallel unit may be supported by sliding bearings, while the low speed shaft of the parallel gear unit may be supported by roller bearings.

In an aspect of the invention a parallel gear unit for a gearbox for a wind turbine is provided, the parallel gear unit comprising at least two parallel shafts, a first shaft being coupled to a first gear having helical teeth and a first diameter, the second shaft being coupled to a second gear meshing with the first gear and having helical teeth and a second diameter smaller than the first diameter, at least one of the first and second shaft being supported by roller bearings, wherein the parallel gear unit furthermore comprises a thrust collar on the second shaft.

According to embodiments of the invention, the gears on the at least two parallel shafts may each have a different diameter and the thrust collar may be provided on the shaft comprising the gear with smallest diameter, e.g. on the pinion.

According to specific embodiments of the invention, the thrust collar may be provided on the high speed shaft.

In an aspect of the invention a parallel gear unit for a gearbox for a wind turbine is provided, the parallel gear unit comprising at least two parallel shafts of which at least one is supported by roller bearings, a first shaft being coupled to a gear wheel having helical teeth and a second shaft being coupled to a pinion gear having helical teeth, wherein the parallel gear unit furthermore comprises a thrust collar on the shaft comprising the pinion.

According to embodiments of the invention, the thrust collar may be in direct contact with the gear with highest diameter. With the thrust collar being in direct contact with the gear with highest diameter is meant that nothing is present in between the thrust collar and the gear with highest diameter.

According to other embodiments of the invention, the thrust collar may be in indirect contact with gear with highest diameter. With the thrust collar being in indirect contact with the gear with highest diameter is meant that an additional part, e.g. wear ring, may be present in between the thrust collar and the gear with highest diameter. The wear ring may have an outer diameter $d_w$ of between $0.8 \times d_0$ and $1.4 \times d_0$, with $$d_0 = z \cdot m_0,$$

wherein z is the number of teeth and $m_0$ the normal module.

According to further embodiments of the invention, the gears on the at least two parallel shafts may each have a different diameter and the thrust collar may be provided on the shaft comprising the gear with highest diameter.

According to embodiments of the invention, the thrust collar may be in direct contact with the gear with smallest diameter. With the thrust collar being in direct contact with the gear with smallest diameter is meant that nothing is present in between the thrust collar and the gear with smallest diameter.

According to other embodiments of the invention, the thrust collar may be in indirect contact with the gear with smallest diameter. With the thrust collar being in indirect contact with the gear with highest diameter is meant that an additional part, e.g. wear ring, may be present in between the thrust collar and the gear with smallest diameter.

The thrust collar may have a contact diameter $d_c$ of between $0.8 \times d_0$ and $1.4 \times d_0$ and a width $w_c$ of between $0.1 \times d_0$ and $0.3 \times d_0$, with $$d_0 = z \cdot m_n,$$

wherein z is the number of teeth and $m_n$ the normal module.

The thrust collar chamfer may be between 0° and 15°, for example between 0.5° and 5° or between 0.5° and 2.5°, and may for example be 1°.

The roller bearings may be selected from the list comprising taper roller bearings, cylindrical roller bearings, spherical roller bearings or CARB toroidal roller bearings. According to embodiments of the invention, each of the at least two shafts may be supported by roller bearings. According to embodiments of the invention, different roller bearings may be selected for the first and second shaft. According to other embodiments of the invention, same roller bearings may be selected for the first and second shaft. Instead of roller bearings, also sliding bearings may be used on the shaft having the gear with the smallest diameter. For example, the parallel gear unit may comprise at least a high speed shaft and a low speed shaft and, according to embodiments of the invention, the high speed shaft of the parallel unit may be supported by sliding bearings, while the low speed shaft of the parallel gear unit may be supported by roller bearings.

In a further aspect of the invention, a gearbox for a wind turbine is provided. The gearbox comprises at least one planetary gear unit and a parallel gear unit. The parallel gear unit comprises at least two parallel shafts, at least one of the shafts being supported by roller bearings and each of the shafts comprising a gear with helical teeth, the gears of each shaft being adapted for meshing with each other, wherein the parallel gear unit furthermore comprises a thrust collar on at least one of the shafts.

In an aspect of the invention, a gearbox is provided for a wind turbine, the gearbox comprising at least one planetary gear unit and a parallel gear unit, wherein the parallel gear unit comprises:

at least two parallel shafts coupled to a gear, at least one of the shafts being supported by roller bearings, and at least one of the parallel shafts comprising a pinion, and a thrust collar on the at least one parallel shaft comprising the pinion.

According to embodiments of the invention, each of the shafts may be supported by roller bearings. According to other embodiments of the invention, one of the shafts, preferably the shaft provided with the gear with smallest diameter, may be supported by sliding bearings while the other shaft(s) may be supported by roller bearings. For example, the parallel gear unit may comprise at least a high speed shaft and a low speed shaft and, according to embodiments of the invention, the high speed shaft of the parallel unit may be supported by sliding bearings, while the low speed shaft of the parallel gear unit may be supported by roller bearings.

The gears on the at least two parallel shafts may each have a different diameter and the thrust collar may be provided on the shaft comprising the gear with smallest diameter.

According to further embodiments of the invention, the gears on the at least two parallel shafts may each have a different diameter and the thrust collar may be provided on the shaft comprising the gear with highest diameter.

In still a further aspect of the invention, a wind turbine is provided comprising a gearbox according to embodiments of the invention.

The above and other characteristics, features and advantages of the present invention will become apparent from the following detailed description, taken in conjunction with the accompanying drawings, which illustrate, by way of example, the principles of the invention.

Same reference signs in the different figures refer to same or analogous elements.

DESCRIPTION OF ILLUSTRATIVE EMBODIMENTS

The present invention will be described with respect to particular embodiments and with reference to certain non-limiting drawings. It has to be understood that the invention is not limited thereto but is only limited by the claims. For illustrative purposes, the size of some of the elements in the drawings may be exaggerated and not drawn on scale.

Terms such as "comprising" and "coupled" are not to be interpreted as limiting the invention in any way. The term "comprising", used in the claims, should not be interpreted as being restricted to the means listed thereafter; it does not exclude other elements or steps. Similarly, it is to be noticed that the term "coupled", also used in the claims, should not be interpreted as being restricted to direct connections only.

While some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Hereinafter, the present invention will be described by means of different embodiments. It has to be understood that these embodiments are only for the ease of understanding the invention and are not intended to limit the invention in any way.

The present invention provides a parallel gear unit for a gearbox in a multi-megawatt wind turbine, a gearbox comprising such a parallel gear unit and a multi-megawatt wind turbine comprising such a gearbox.

It was already described earlier that during operation wind turbines, and especially multi-megawatt wind turbines, create high dynamic forces to and speed variations in the gearbox during operation. This dynamic behaviour can lead to bearing damages and consequently to bearing failures. One of the possible causes of bearing failure could be axial movement of the rollers in the bearings due to axial forces and the dynamic of these axial forces. Hence, on top of the radial load acting on the bearings, these axial forces may induce axial vibration of the bearings.

Furthermore, noise behaviour is identified as an important parameter in the design of multi-megawatt wind turbine gearboxes. For optimising noise behaviour, parallel gear units of gearboxes are designed to have helical toothing with a big helix angle. Such big helix angles lead to the creation of high radial and axial loads. For taking up the actual loads in such multi-megawatt wind turbine gearboxes bearings with high capacity are required. For higher bearing capacity, the size of the bearings increases and the limiting or maximum speed of the bearings decreases.

For multi-megawatt wind-turbines, available bearings for use in parallel gear units of a gearbox may not be able to sufficiently separate axial and radial forces, through which additional axial bearings may be required for compensating for the axial forces which originate from helical teeth of the gears. Furthermore, even if such available bearings would be able to partly or fully take up the axial and radial forces, they cannot do this at the required high rotational speeds of for example between 1500 rpm and 2000 rpm.

Therefore, the present invention teaches to use a combination of suitable bearing arrangements and the provision of a thrust collar on at least one of the shafts of the parallel gear unit.

The invention is based on the insight that, because of the increasing output power and thus the increasing load that are created inside the gearbox of multi-megawatt wind turbines, finding or developing suitable bearings that fulfill all of the above described requirements for parallel gear units for gearboxes is very difficult or even no longer possible, but that a combination of suitable bearing arrangements and the use of a thrust collar on at least one shaft, for example the high speed shaft, of the parallel gear unit can provide suitable uptake of axial and radial loads originating from gear toothing while still allowing high rotational speeds of, for example, between 1500 rpm and 2000 rpm.

Although the use of a thrust collar is known in planetary stages of gearboxes, as for example described in DE 198 52

663 and EP 1 857 713, it is not straightforward to use such thrust collars in cases as described in the present invention because these documents do not teach how and on what location to use such thrust collars in parallel gear units, nor do they teach the properties these thrust collars should have for being suitable to be used in parallel gear units.

In one aspect, the present invention provides a parallel gear unit for a gearbox for a multi-megawatt wind turbine. With multi-megawatt wind turbine is meant a wind turbine which is able to generate more than 1 megawatt of electricity. The parallel gear unit comprises at least two parallel shafts, at least one of the shafts being supported by roller bearings and each of the shafts comprising a gear with helical teeth, the gears of each shaft being adapted for meshing with each other. The parallel gear unit furthermore comprises a thrust collar on at least one of the shafts.

The gears on the at least two parallel shafts may each have a same or a different diameter. In case the at least two parallel shafts have gears with a different diameter, according to embodiments of the invention, the thrust collar may be provided on the shaft comprising the gear with smallest diameter. According to other embodiments of the invention, the thrust collar may be provided on the shaft comprising the gear with the highest diameter. In case the at least two parallel shafts have gears with a same diameter, the thrust collar may be provided on one of the shafts or may be provided on more shafts. According to specific embodiments of the invention, the thrust collar may be provided on a shaft coupled to the generator of the wind turbine.

An advantage of a parallel gear unit according to embodiments of the invention is that additional axial bearings on each shaft are not necessary because axial forces resulting of the helical teeth of the gears are directly taken by the thrust collar. Hence, in a parallel gear unit according to embodiments of the invention the roller bearings supporting the shafts do not suffer from high axial forces or at least will suffer less from such axial forces than prior art bearings do. Consequently, the roller bearings may have a longer life time.

In a parallel gear unit according to embodiments of the invention, the bearings on the shafts can withstand the load created while still allowing high rotational speeds of, for example, between 1500 rpm and 2000 rpm.

The effect of providing a thrust collar according to embodiments of the invention is also a reduction of the normally severe axial loads in the housing because axial forces are taken up in a small loop within the gears. This will offer the possibility to use light materials or thinner wall thicknesses in the design of the housings of the gearbox.

Figure 4:
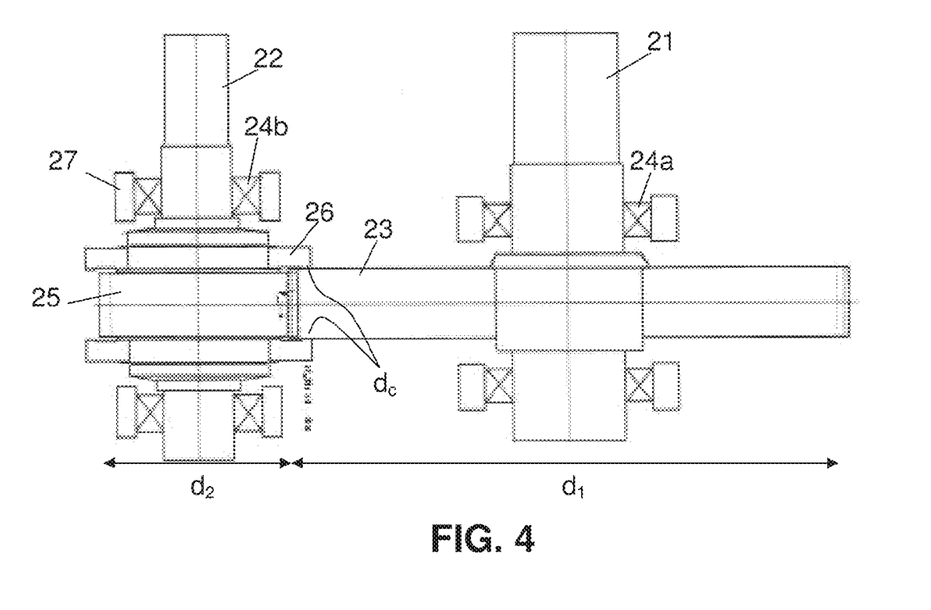
FIG. 4 illustrates a parallel gear unit according to an embodiment of the present invention.

FIG. 4 illustrates part of a parallel gear unit 20 according to a first embodiment of the present invention. In the example given, a first shaft 21 and a second shaft 22 are illustrated which are parallel to each other. As already described above, a parallel gear unit 20 of a gearbox may comprise a low speed shaft, an intermediate shaft and a high speed shaft in case of a two-stage parallel gear unit or may comprise a low speed shaft and a high speed shaft in case of a one-stage parallel gear unit. For example, with reference to FIG. 4, the first shaft 21 may be the low speed shaft of the parallel gear unit 20 and the second shaft 22 may be the intermediate shaft of the parallel gear unit 20. Or the first shaft 21 may be the intermediate shaft of the parallel gear unit 20 and the second shaft 22 may be the high speed shaft of the parallel gear unit 20. According to still further embodiments of the invention, in case of a one-stage parallel gear unit, the first shaft 21 may be the low speed shaft of the parallel gear unit 20 and the second shaft 22 may be the high speed shaft of the parallel gear unit 20. It has to be noted that, as known by a person skilled in the art, the low speed shaft may also be referred to as low speed intermediate shaft and the intermediate shaft may also be referred to as high speed intermediate shaft.

The first shaft 21 is coupled to a first gear 23, which may also be referred to as gear wheel, and is supported by roller bearings 24a. The gear 23 has helical teeth and has a diameter $d_1$. The second shaft 22 is coupled to a second gear 25, which may also be referred to as pinion, and is supported by roller or sliding bearings 24b. The second gear or pinion 25 also has helical teeth. The second gear 25 meshes with the first gear 23 and has a diameter $d_2$ which is smaller than the diameter $d_1$ of the first gear 23.

According to embodiments of the invention, in case both the first and second shaft 21, 22 are rotatably supported by roller bearings, the type of roller bearings 24a used on the first shaft 21 may be the same as the roller bearings 24b used on the second shaft 22. However, according to other embodiments of the invention, the roller bearings 24a used on the first shaft 21 may be different from the roller bearings 24b used on the second shaft 22. The roller bearings 24a, 24b may be any kind of known roller bearings such as, for example, tapered roller bearings, cylindrical roller bearings, spherical roller bearings or CARB toroidal roller bearings (see further). According to further embodiments of the invention, the first shaft 21 which comprises the gear 23 with highest diameter, may be supported by roller bearings 24a while the second shaft 22, which comprises the gear 25 with smallest diameter, may be supported by sliding bearings 24b. According to a specific embodiment, the high speed shaft may be provided with sliding bearings 24.

Referring to the examples given above, if the first shaft 21 is the low speed shaft of the parallel gear unit 20 and the second shaft 22 is the intermediate shaft of the parallel gear unit 20, the gear 23 may be referred to as low speed gear. If the first shaft 21 is the intermediate shaft of the parallel gear unit 20 and the second shaft 22 is the high speed shaft of the parallel gear unit 20, the gear 23 may be referred to as intermediate gear.

The parallel gear unit 20 furthermore comprises a thrust collar 26. The thrust collar 26 may be provided on at least one of the shafts 21, 22. According to embodiments of the invention, the thrust collar may be provided on at least one of the low speed shaft, the intermediate shaft and the high speed shaft. In the example given in FIG. 4, a thrust collar is provided on the shaft comprising the gear with the smallest diameter, which is in this case the second shaft 22 comprising pinion 25 with diameter $d_2$ smaller than diameter $d_1$ of the gear wheel 23. However, according to other embodiments of the invention, the thrust collar 26 may also be provided on the shaft comprising the gear with the highest diameter which is in this case the first shaft 21 with gear wheel 23 having diameter $d_1$ which is higher than diameter $d_2$ of the pinion 25 (see further).

In the embodiment illustrated in FIG. 4, the thrust collar 26 is provided in direct contact with the gear wheel 23. With the thrust collar 26 being in direct contact with the gear wheel 23 is meant that no other parts are present in between the thrust collar 26 and the gear wheel.

In the figures, reference number 27 schematically illustrates the housing of the gearbox.

Figure 5:
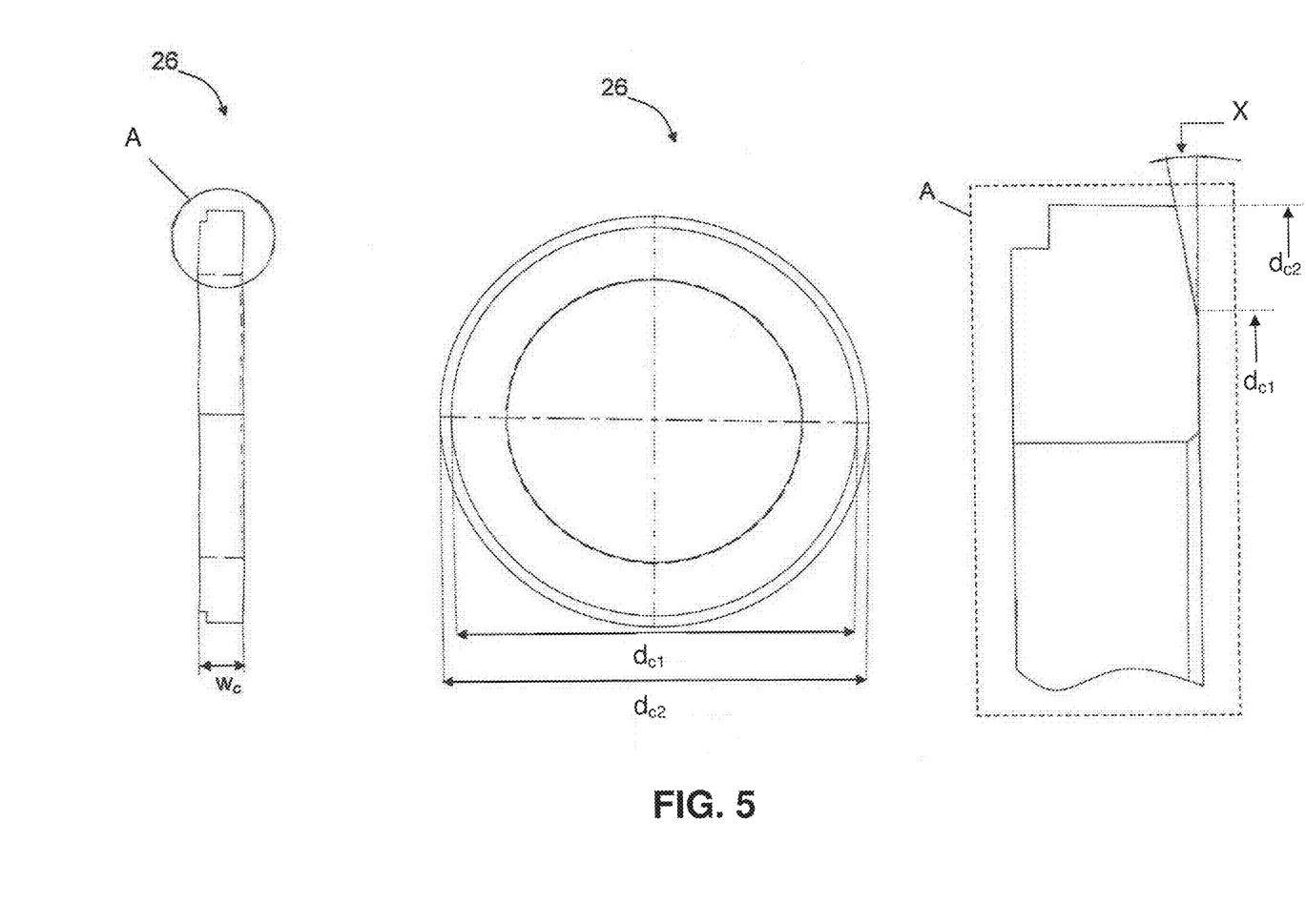
FIG. 5 illustrates a thrust collar that can be used with a parallel gear unit according to embodiments of the invention.

FIG. 5 illustrates an example of a thrust collar 26 that can be used in a parallel gear unit 20 according to embodiments of the invention. It has to be understood that this is only an example and that this is not intended to limit the invention in any way. The drawing at the left of FIG. 5 shows a side view and the drawing in the middle of FIG. 5 shows a top view of such thrust collar 26. The thrust collar 26 may have a contact diameter $d_c$ of between $0.8 \times d_0$ and $1.4 \times d_0$ and a width $w_c$ of between $0.1 \times d_0$ and $0.3 \times d_0$, with $$d_0 = z \cdot m_n,$$

wherein z is the number of teeth and $m_n$ the normal module.

The right drawing of FIG. 5 illustrates part A as indicated in the left drawing of FIG. 5. From this right drawing it can be seen that the thrust collar comprises a thrust collar chamfer X. The thrust collar chamfer X may be between 0° and 15°, for example between 0.5° and 5° or between 0.5° and 2.5°, and may for example be 1°. Because of the existence of the thrust collar chamfer X, the thrust collar 26 may have a first contact diameter $d_{c1}$ and a second contact diameter $d_{c2}$, as illustrated in FIG. 5, by which $d_{c1}$ is smaller than $d_{c2}$. The difference between $d_{c1}$ and $d_{c2}$ is determined by the size of the thrust collar chamfer X.

Figure 6:
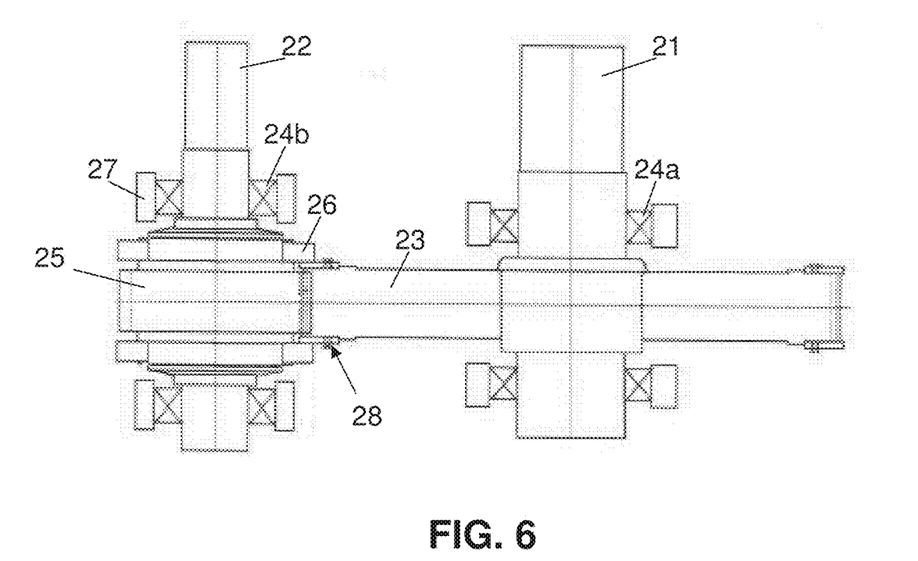
FIG. 6 illustrates a parallel gear unit according to an embodiment of the present invention.

FIG. 6 illustrates a second embodiment of a parallel gear unit 20 according to the present invention. The only difference between the present embodiment and the embodiment illustrated in FIG. 4 is that in the present embodiment the thrust collar 26 is in indirect contact with the gear wheel 23. With the thrust collar 26 being in indirect contact with the gear wheel 23 is meant that there is an additional part present in between the thrust collar 26 and the gear wheel 23. According to the present embodiment, the additional part is a wear-ring 28.

Figure 7:
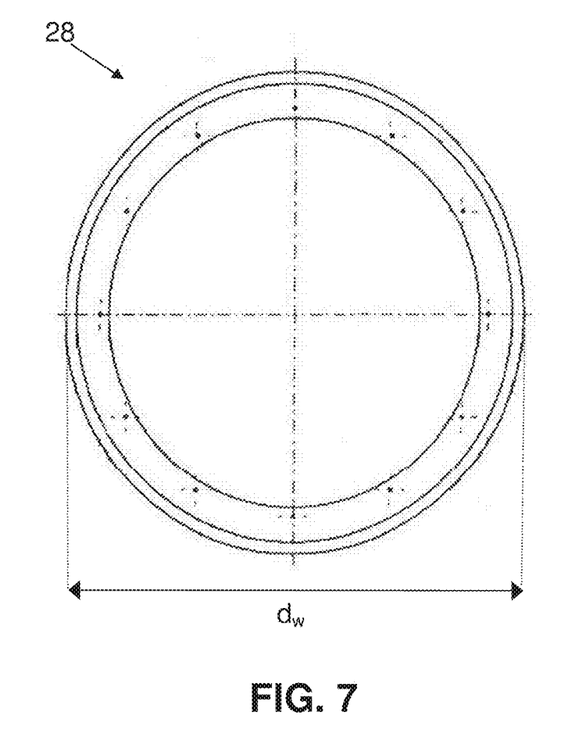
FIG. 7 illustrates a wear ring that can be used with a parallel gear unit according to embodiments of the present invention.

FIG. 7 illustrates a wear ring 28 that can be used in a parallel gear unit 20 according to embodiments of the invention. According to an exemplary embodiment, the wear ring 28 may have an outer diameter $d_w$ of between $0.8 \times d_0$ and $1.4 \times d_0$, with $$d_0 = z \cdot m_0,$$

wherein z is the number of teeth and m, the normal module.

It has to be understood that this is only an example and is not intended to limit the invention in any way. In the example given in FIG. 7, when the thrust collar 26 is provided on the shaft 22 comprising the gear with smallest diameter, i.e. the pinion 25, the width $w_w$ of the wear ring 28 depends on the width of the gear wheel 23. According to other embodiments, where the thrust cam 26 is provided on the shaft 21 comprising the gear with highest diameter, i.e. the gear wheel 25, the width $w_w$ of the wear ring 28 depends on the width of the pinion 25.

In between the thrust collar 26 and the wear ring 28, a gap with a width of between 0.029 mm and 0.098 mm may be present in order to allow sufficient lubrication. For lubrication purposes a same lubricating fluid, e.g. oil, may be used as is used for lubricating the other parts of the gearbox. Hence, no separate or different lubrication mechanism has to be provided for lubricating the thrust collar 26 and/or wear ring 28.

Figure 8:
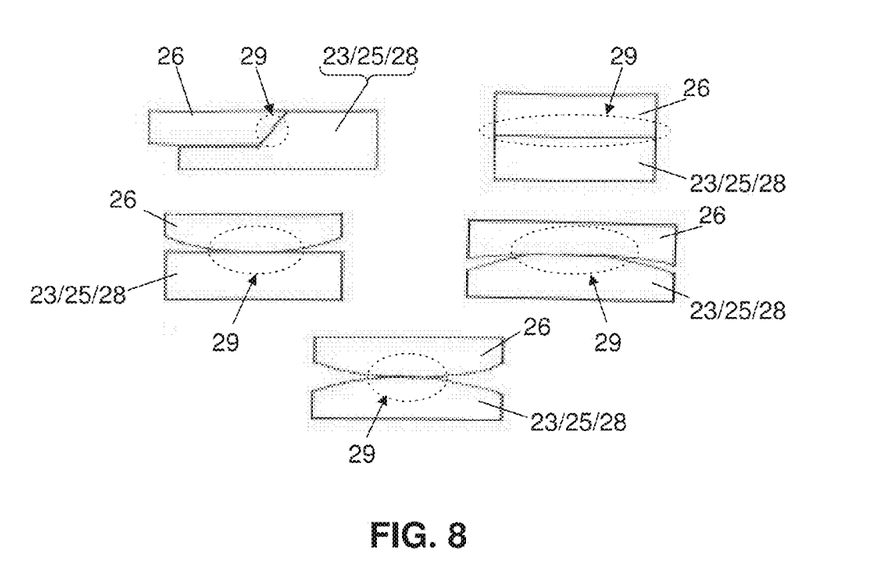
FIG. 8 illustrates possible shapes of the contact area or contact zone between the wear ring and the thrust collar.

In the parallel gear units 20 according to the above described embodiments, depending on whether the thrust collar 26 is provided on the gear 23, 25 with highest or smallest diameter and whether a wear ring 28 is provided in between the thrust collar 26 and the gear 23, 25, a contact area or contact zone 29 may be defined in between the thrust collar 26 and the gear 23 or 25, or in between the thrust collar 26 and the wear ring 28. FIG. 8 illustrates different shapes of the contact area or contact zone 29 between the thrust collar 26 and the gear 23 or 25 or between the thrust collar 26 and the wear ring 28. The shape of the contact area or contact zone 29 may be calculated using any suitable technique known by a person skilled in the art.

Hereinafter, some examples of implementations of parallel gear units 20 according to embodiments of the invention will be described. It has to be understood that this is only by way of an example and for the purpose of illustration and is not intended to limit the invention in any way.

Figure 9:
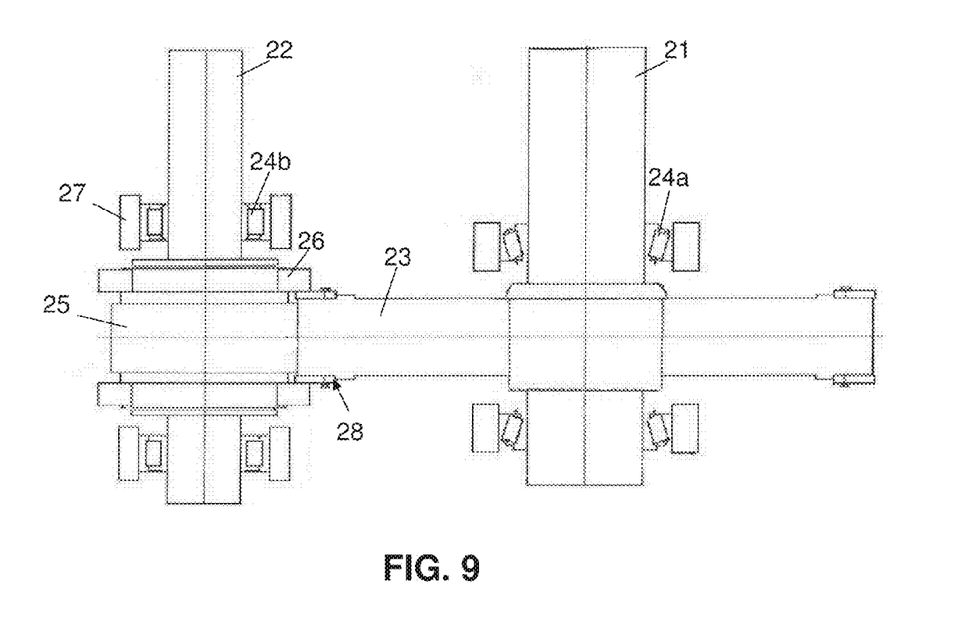
FIG. 9 to FIG. 11 illustrate parallel gear units according to different embodiments of the present invention.

In FIG. 9 the first shaft 21 is supported by taper roller bearings 24a and the second shaft 22 is supported by cylindrical roller bearings 24b. A thrust collar 26 is provided on the second shaft 22, i.e. the shaft with the gear 25 with the smallest diameter, i.e. the pinion 25. In between the thrust collar 26 and the gear wheel 23, a wear ring 28 is present, such that the thrust collar 26 is in indirect contact with the gear wheel 23.

Figure 10:
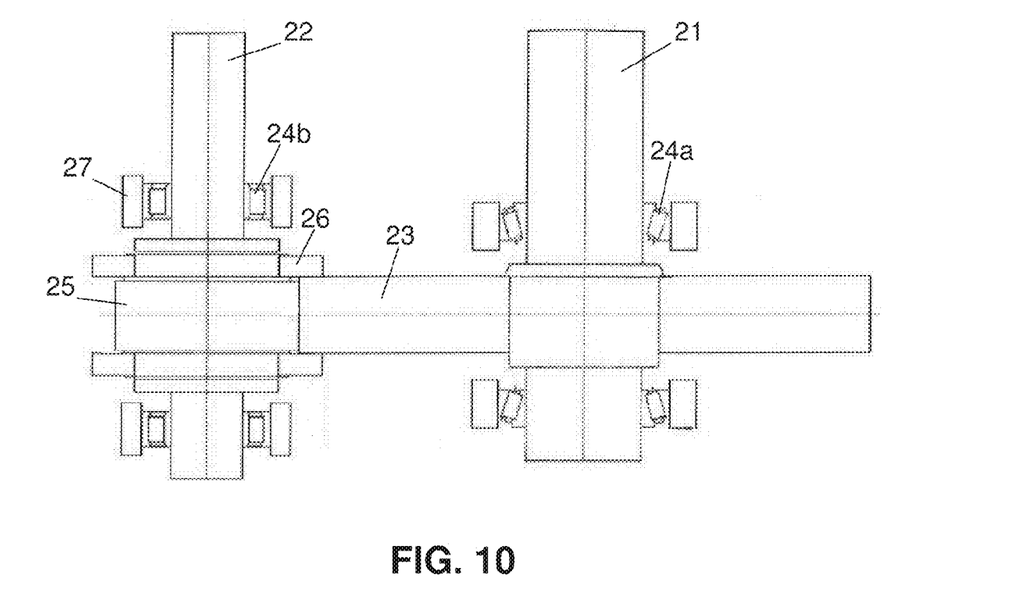

FIG. 10 illustrates a similar implementation as in FIG. 9. The first shaft 21 is supported by taper roller bearings 24a and the second shaft 22 is supported 16 by cylindrical roller bearings 24b. A thrust collar 26 is provided on the second shaft 22, i.e. the shaft with the gear 25 with the smallest diameter, i.e. the pinion 25. The difference between the present example and the example in FIG. 9 is that in the present example the thrust collar 26 is in direct contact with the gear wheel 23, i.e. no wear ring 28 is present in between the thrust collar 26 and the gear wheel 23.

Figure 11:
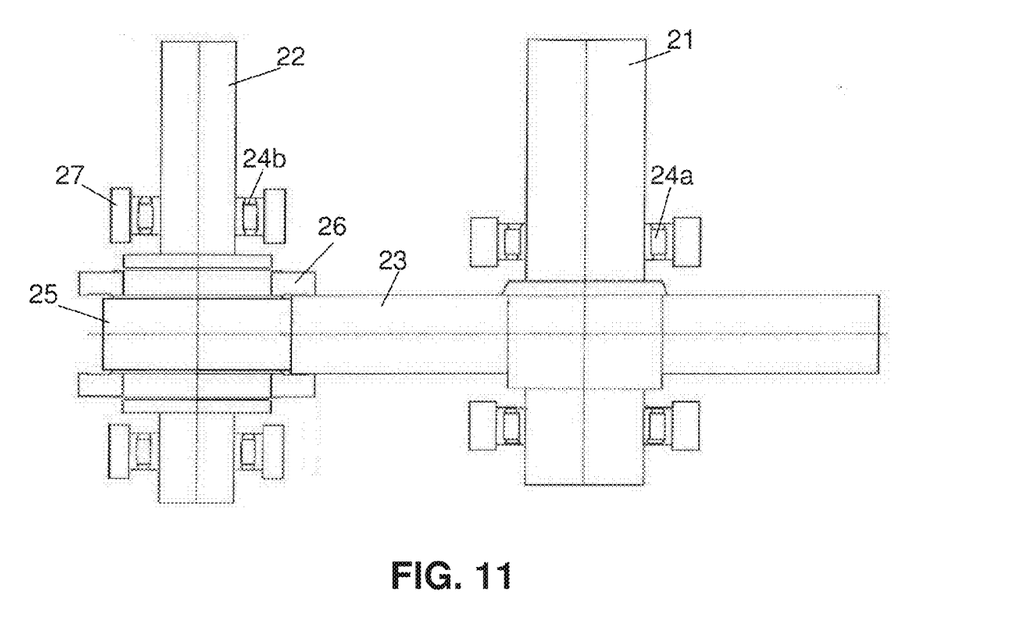

In FIG. 11 the first shaft 21 is supported by cylindrical roller bearings 24a and the second shaft 22 is supported by CARB toroidal roller bearings 24b. In the present example, the cylindrical roller bearings 24a on the first shaft 21 are 10 provided in an X-configuration. A thrust collar 26 is provided on the second shaft 22, i.e. the shaft with the gear 25 with the smallest diameter, i.e. the pinion 25. The thrust collar 26 is in direct contact with the gear wheel 23, i.e. no wear ring 28 is present in between the thrust collar 26 and the gear wheel 23.

Figure 12:
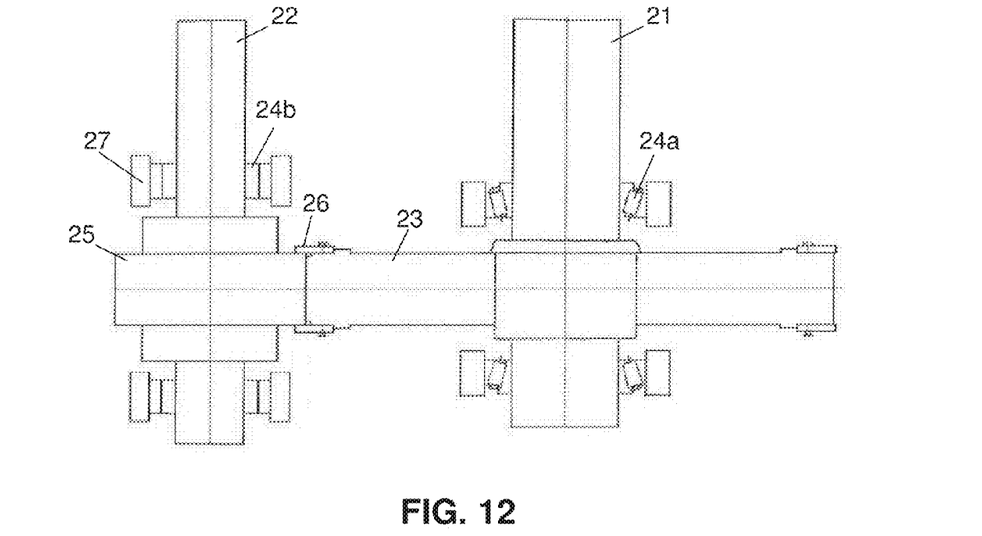
FIG. 12 illustrates a parallel gear unit according to an embodiment in which sliding bearings are provided on the shaft with gear with smallest diameter.

In FIG. 12 the first shaft 21 is supported by taper roller bearings 24a and the second shaft 22 is supported by sliding bearings 24b. A thrust collar 26 is provided on the first shaft 21, i.e. the shaft with the gear 23 with the highest diameter, i.e. the gear wheel 23. The thrust collar 26 is in direct contact with the pinion 25, i.e. no wear ring 28 is present in between the thrust collar 26 and the pinion 25. It has to be understood that sliding bearings 24b for supporting the second shaft 22, i.e. the shaft with the gear 25 with smallest diameter, may also be used in case the thrust collar 26 is provided on the shaft 22 comprising the gear 25 with smallest diameter, with or without the presence of a wear ring 28.

Figure 13:
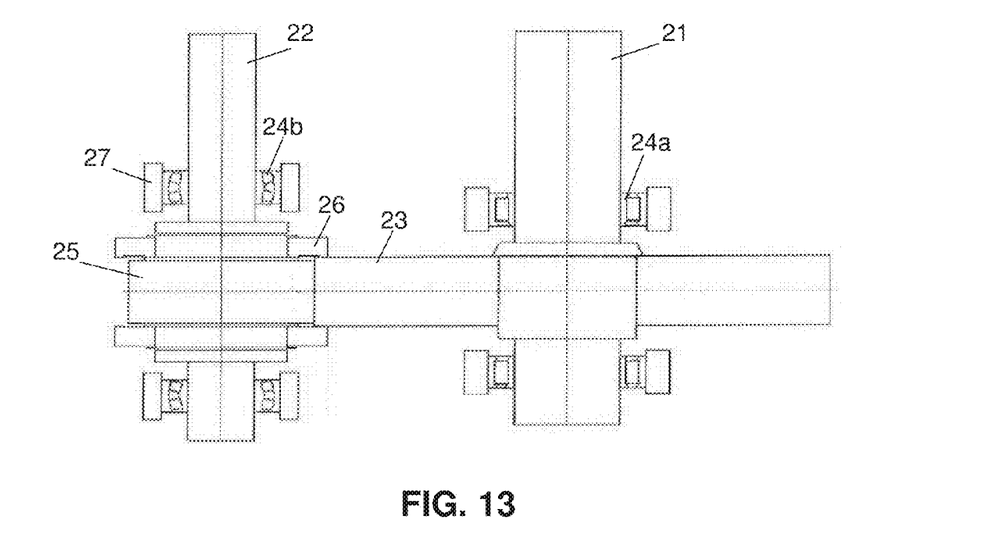
FIG. 13 illustrates a parallel gear unit according to an embodiment of the present invention.

In FIG. 13 the first shaft 21 is supported by cylindrical roller bearings 24a and the second shaft 22 is supported by spherical bearings 24b. In the present example, the cylindrical roller bearings 24a are provided in an O-configuration. A thrust collar 26 is provided on the second shaft 22, i.e. the shaft with the gear 25 with the smallest diameter, i.e. the pinion25. The thrust collar 26 is in 30 indirect contact with the gear wheel 23, i.e. a wear ring 28 is present in between the thrust collar 26 and the gear wheel 23.

It has to be understood that in the above examples, the type of roller bearings 24a, 24b used on the first and second shaft 21, 22 can be interchanged or can be the same for both the first and second shaft 21, 22. Any combination of roller bearings 24a, 24b on the first and second shaft 21, 22 is disclosed in the present invention. Furthermore, any combination of roller bearings as described above can be combined with a thrust collar 26 provided on the gear with the smallest diameter or with a thrust collar 26 provided on the gear with the highest diameter. Moreover, any such combination can be combined with the optional presence of a wear ring 28 in between the gear 23, 25 and the thrust collar 26. Furthermore, sliding bearings may be used for supporting the second shaft 22 comprising the gear 25 with the smallest diameter in combination with any type of roller bearing on the first shaft 21 comprising the gear 25 with highest diameter.

In a second aspect, the present invention also provides a gearbox 30. The gearbox 30 comprises at least one planetary gear unit 31 and a parallel gear unit 20. The parallel gear unit 20 comprises at least two parallel shafts 21, 22, at least one of the shafts 21, 22 being supported by roller bearings 24 and each shaft comprising a gear 23, 25 with helical teeth, the gears 23, 25 of each shaft being adapted for meshing with each other, wherein the parallel gear unit 20 furthermore comprises a thrust collar 26 on at least one of the shafts 21, 22. The parallel gear unit 20 in the gearbox 30 according to embodiments of the invention can be implemented in all ways that have been described above with respect to the first aspect of the invention.

Figure 14:
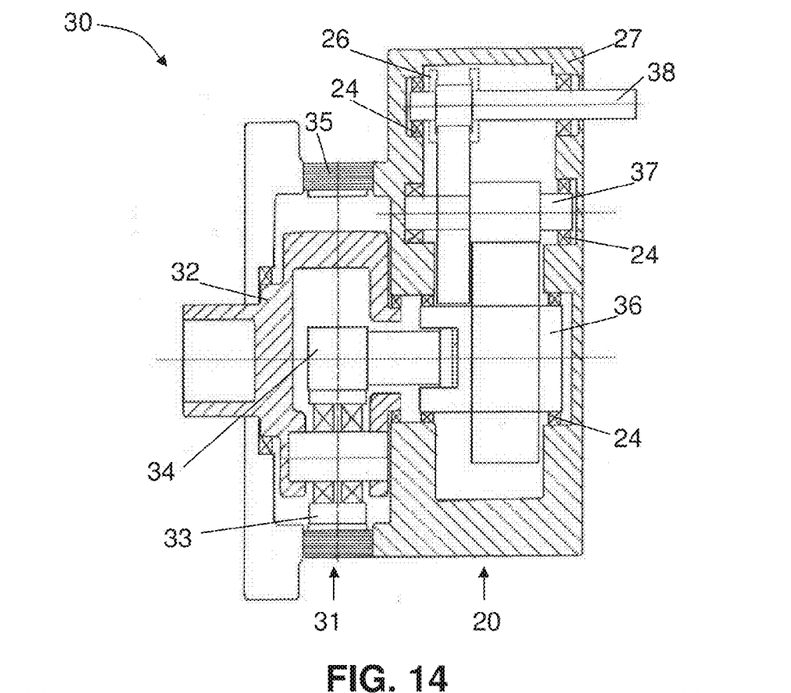
FIG. 14 illustrates a gearbox according to embodiments of the present invention comprising one planetary gear unit and a two-stage parallel gear unit.

FIG. 14 illustrates a gearbox 30 according to a first embodiment of the second aspect of the present invention. The gearbox 30 comprises a housing 27, one planetary gear unit 31 and a two-stage parallel gear unit 20. The planetary gear unit 31 comprises a planet carrier 32 supporting a plurality of planet gears 334. The planet gears 33 mesh with a sun gear 34 and a ring gear 35. According to the first embodiment, the parallel gear unit 20 is a two-stage parallel gear unit 20 and comprises a low speed shaft 36, an intermediate shaft 37 and a high speed shaft 38. In the example given, a thrust collar 26 is provided on the high speed shaft 38. It has, however, to be understood that the thrust collar 26 could, according to other embodiments, also be provided on the intermediate shaft 37 or on the low speed shaft 36. Furthermore, the parallel gear unit 20 in the gearbox 30 illustrated in FIG. 14 may be any parallel gear unit 20 as described in the embodiments of the first aspect of this invention.

Figure 15:
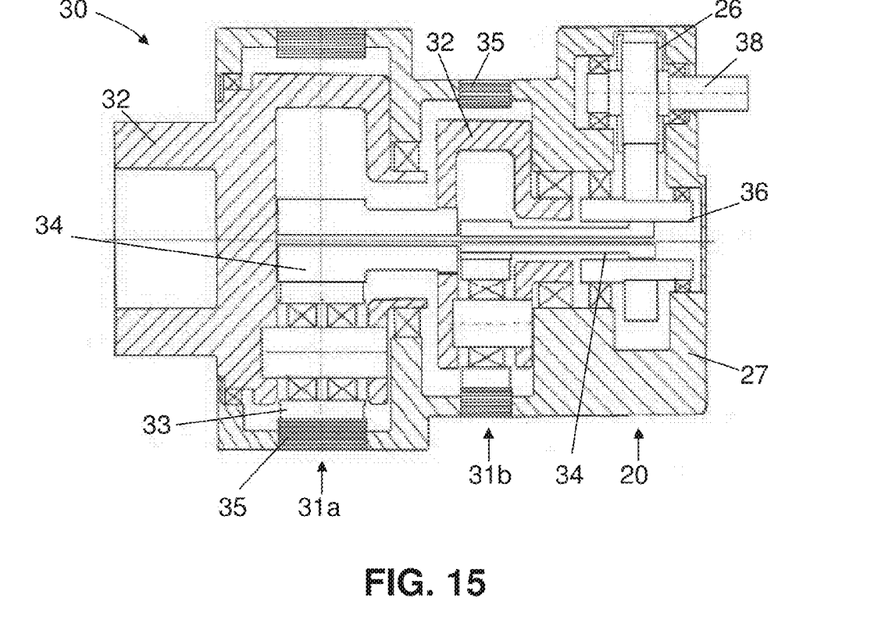
FIG. 15 illustrates a gearbox according to embodiments of the present invention comprising two planetary gear units and a one-stage parallel gear unit.

FIG. 15 Illustrates a gearbox 30 according to a second embodiment of the second aspect of the present invention. The gearbox 30 comprises two planetary gear units 31a and 31b and a one-stage parallel gear unit 20. Each of the planetary gear units 31a, 31b comprises the same parts as described for the planetary gear unit 31 in the first embodiment. The parallel gear unit 20 is a one-stage parallel gear unit 20 and comprises a low speed shaft 36 and a high speed shaft 38. A thrust collar 26 is provided on the high speed shaft 38. According to other embodiments, however, the thrust collar 26 may also be provided to the low speed shaft 36. Again, it has to be understood that the parallel gear unit 20 in the gearbox 30 illustrated in FIG. 15 may be any parallel gear unit 20 as described in the embodiments of the first aspect of this invention.

In a third aspect, the present invention also provides a wind turbine comprising a gearbox 30 according to embodiments of the invention. The gearbox 30 may comprise at least one planetary gear unit 31 and a parallel gear unit 20. The parallel gear unit 20 comprises at least two parallel shafts 21, 22, at least one of the shafts 21, 22 being supported by roller bearings 24a, 24b and each of the shafts 21, 22 comprising a gear 23, 25 with helical teeth, the gears 23, 25 of each shaft being adapted for meshing with each other, wherein the parallel gear unit 20 furthermore comprises a thrust collar 26 on at least one of the shafts 21, 22. The gearbox 30 may be any gearbox as described with respect to the second aspect of this invention, comprising a parallel gear unit 20 in the gearbox 30 illustrated in FIG. 15 may be any parallel gear unit 20 as described in the embodiments of the first aspect of this invention.

The invention claimed is:

1. A parallel gear unit for a gearbox for a wind turbine, the parallel gear unit comprising:
   two parallel shafts, at least one of the shafts being supported by roller bearings, each shaft comprising a gear with helical teeth, the gears being adapted for meshing with each other, and
   a thrust collar on at least one of the shafts,
      wherein the gears on the two parallel shafts each have a different diameter,
      the thrust collar is provided on the shaft comprising the gear having the smallest diameter, and
      the thrust collar is in direct contact with the gear having the largest diameter.

2. The parallel gear unit according to claim 1, wherein the roller bearing is selected from taper roller bearings, cylindrical roller bearings, spherical roller bearings or CARB toroidal roller bearings.

3. The parallel gear unit according to claim 1, wherein each of the two parallel shafts are supported by roller bearings.

4. The parallel gear unit according to claim 1, wherein at least one of the parallel shafts is supported by a sliding bearing.

5. The parallel gear unit according to claim 1, wherein the shaft comprising the gear having the smallest diameter is supported by a sliding bearing.

6. A gearbox for a multi-megawatt wind turbine, the gearbox comprising:
   at least one planetary gear unit; and
   a parallel gear unit, wherein the parallel gear unit comprises:
   two parallel shafts, at least one of the shafts being supported by roller bearings, each shaft comprising a gear with helical teeth, the gears being adapted for meshing with each other; and
   a thrust collar on at least one of the shafts,
   wherein the gears on the two parallel shafts each have a different diameter,
   the thrust collar is provided on the shaft comprising the gear having the smallest diameter, and
   the thrust collar is in direct contact with the gear having the largest diameter.

7. A wind turbine comprising the gearbox according to claim 6.

8. The gearbox according to claim 6, wherein the thrust collar is provided on a shaft that is coupled to a generator of the wind turbine.

* * * * *